United States Patent
Breuer et al.

(10) Patent No.: US 7,812,106 B2
(45) Date of Patent: Oct. 12, 2010

(54) COPOLYMERIZABLE EMULSIFIERS AND EMULSION POLYMERIZATION PROCESSES USING THE SAME

(75) Inventors: Wolfgang Breuer, Korschenbroich (DE); Patrick Tintillier, Boissise le Roi (FR)

(73) Assignee: Cognis IP Management GmbH, Duesseldorf (DE)

( * ) Notice: Subject to any disclaimer, the term of this patent is extended or adjusted under 35 U.S.C. 154(b) by 105 days.

(21) Appl. No.: 10/929,864

(22) Filed: Aug. 30, 2004

(65) Prior Publication Data

US 2005/0070679 A1    Mar. 31, 2005

(30) Foreign Application Priority Data

Aug. 30, 2003   (DE) .................. 103 40 081

(51) Int. Cl.
*C08F 20/06*   (2006.01)
*C08F 118/02*  (2006.01)

(52) U.S. Cl. .................. 526/317.1; 526/319
(58) Field of Classification Search .............. 526/317.1, 526/319

See application file for complete search history.

(56) References Cited

U.S. PATENT DOCUMENTS 4,764,554 A * 8/1988 Tonge ................. 524/558
5,189,107 A * 2/1993 Kasai et al. .............. 525/244

FOREIGN PATENT DOCUMENTS

DE    198 31 706 A1    1/2000
DE    19831706 A1 *    1/2000

OTHER PUBLICATIONS

Otto, "Radiotracermethode zur Bestimmung der Verteilung schwefelhaltiger Dispergiermittel in Emulsionspotymerisaten", Isotopenpraxis, vol. 20, (1984), 10, pp. 378-381.
Grade, Non-Migratory Surfactants, European Coatings Journal, (2001), 5, pp. 66-70.
Karsa, Surfactants in Polymers, Coatings, Inks and Adhesives, Blackwell Publishing Co., CRC Press, Chapter 3, (2003), pp. 71-92 (ISBN 0-8493-2808-X).
Poulton, "Shifting to Acrylics", PPCJ, vol. 192, (2002), 4457, pp. 24-26.
Mestach, "New High Performance Materials for Waterbome Acrylic Surface Coatings", Double Liaison—.Physique, Chemie & Economie des Peintures & Adhesifs, (2001), No. 523, pp. 33-38.
Urquiola et al., "Emulsion Polymerization of Vinyl Acetate Using a Polymerizable Surfactant. II. Polymerization Mechanism", Journal of Polymer Science: Part A: Polymer Chemistry, vol. 30, John Wiley & Sons, Inc., (1992), pp. 2631-2644.

* cited by examiner

*Primary Examiner*—David Wu
*Assistant Examiner*—Michael M Bernshteyn

(57) ABSTRACT

Processes for the production of polymers by emulsion polymerization of olefinically unsaturated monomers, in which olefinically unsaturated esters corresponding to formula (I):

$$HOOC-CH=CH-COO-(BO)_z(PO)_y(EO)_xR^1 \qquad (I)$$

in which $R^1$ is an alkyl group or alkenylphenol group containing 8 to 24 carbon atoms, BO is a butylene oxide unit, PO is a propylene oxide unit and EO is an ethylene oxide unit and the indices x, y and z independently of one another stand for 0 or for numbers of 1 to 50, with the proviso that at least one of the indices x, y and z is not 0, the carboxyl group of the compounds (I) being completely or partly present in neutralized form and the C=C double bond being cis- or trans-configured; are used as copolymerizable emulsifiers.

19 Claims, No Drawings

COPOLYMERIZABLE EMULSIFIERS AND EMULSION POLYMERIZATION PROCESSES USING THE SAME

BACKGROUND OF THE INVENTION

Emulsion polymerization is a special polymerization process, in which olefinically unsaturated monomers poorly soluble in water are emulsified in water with the aid of emulsifiers and are polymerized using water-soluble initiators, such as for example potassium peroxodisulfate or redox initiators. Anionic and/or nonionic surfactants are the key constituents. They guarantee the process of emulsion polymerization through the formation of micelles in the aqueous solution.

The main uses of latices in the coating industry are to be found in the following fields of application: paints and lacquers for decorative purposes and industrial applications, textile treatments, paper coatings and adhesives, i.e. in areas where films are formed from dispersions in the broadest sense after drying.

In most cases, the surfactants or emulsifiers used are physically bound to the surface of the latices and are in a dynamic equilibrium with the water phase. Except for a small part attributable to transfer reactions during the polymerization process, the surfactants are not covalently bonded to the polymer particles. The quantitative distribution of the emulsifier based on sulfosuccinates can be determined, for example, by the radio tracer technique using $^{35}$S. As known to the expert, ca. 15% of the emulsifier are fixed to the latices, cf. R. Otto "Radiotracermethode zur Bestimmung der Verteilung schwefelhaltiger Dispergiermittel in Emulsionspolymerisaten", Isotopenpraxis 20 (1984), 378-381.

For some time, improvements in film formation or improved film stability, for example towards shear forces, or increased water stability have also been attributed to the so-called copolymerizable surfactants, i.e. surfactants which carry a polymerizable group. Accordingly, they may also react as special monomers and participate in the polymerization process.

These special monomers are also referred to in the literature as "surfmers" or non-migratory surfactants. These surfactants are normally incorporated in the polymer particles during the emulsion polymerization process. Because they are chemically fixed to polymer particles, these surfmers—in contrast to the surfactants normally used—cannot readily be desorbed and remain in or on the surface of the polymer particles. In the general opinion of experts, the consequences are advantages in regard to latex stability and water absorption for the latices or films formed from them, cf. Jo Grade "Non-Migratory Surfactants" in European Coatings Journal, 2001, 5, 66-70.

A detailed summary of polymerizable surfactants (surfmers) for emulsion polymerization can be found in: "Surfactants in Polymers, Coatings, Inks and Adhesives"; edited by David R. Karsa; ISBN 0-8493-2808-X; Blackwell Publishing, CRC Press 2003; Chapter 3, pages 71-92. Surfmers can be synthesized, for example, from maleic anhydride. The C=C double bond remaining in the compounds obtained is then the reactive copolymerizable part of the surfactants, cf. pages 72-75 of the publication just cited.

Copolymerizable surfactants of another type are described by S. Poulton in the journal PPCJ, 192 (2002) 4457, pages 24-26. These are alkoxylated (meth)acrylic acid derivatives, so-called bisomers. These bisomers are suitable, for example, for lowering the glass transition temperature of polymers and for the production of polymer dispersions low in VOC.

The laurylic acid semiester of maleic anhydride is known from the literature and commercially available under the name of "Setalux 6774 EPL" from Akzo Nobel Resins, cf. (D. Mestach: "New high performance materials for waterborne acyclic surface", Double Liaison—Physique, Chemie.& Economie des Peintures & Adhesifs, 2001, No. 523, pp. 33-38). Unfortunately, the poor water solubility of the product is an obstacle to certain applications in the field of emulsion polymerization. Applicants' own "TREM® LF 40", a sulfosuccinate-based product, is also known. Applications are described inter alia in: M. B. Urquiola, V. L. Dimonie, E. D. Sudol and M. S. El-Aasser, "Emulsion Polymerization of Vinyl Acetate Using a Polymerisable Surfactant. II. Polymerization Mechanism", J. Polym. Sci. Part A: Polym. Chem., 30 (1992), 2631.

It is also known that the solubility of maleic acid semiesters in water can be improved by reacting them with ethylene oxide, the ethylene oxide reacting at the carboxyl group of the maleic acid semiester, cf. the above-cited publication "Surfactants in Polymers, Coatings, Inks and Adhesives", pp. 74-75.

DE-A-19831706 describes a process for the production of polymers by emulsion polymerization of unsaturated monomers, in which the copolymerizable emulsifiers used are maleic acid esters corresponding to formula (I):

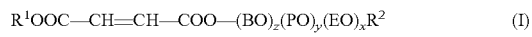

$$R^1OOC\text{—}CH\text{=}CH\text{—}COO\text{—}(BO)_z(PO)_y(EO)_xR^2 \qquad (I)$$

in which $R^1$ is a linear or branched alkyl and/or alkenyl group containing 6 to 24 carbon atoms, $R^2$ is an alkyl group containing 1 to 4 carbon atoms, BO is a butylene oxide unit, PO is a propylene oxide unit and EO is an ethylene oxide unit and the indices x, y and z independently of one another stand for 0 or for numbers of 1 to 100, with the proviso that at least one of the indices x, y and z is not 0.

SUMMARY OF THE INVENTION

This invention relates generally to polymers and, more particularly, to an emulsion polymerization process using new copolymerizable emulsifiers. The invention also relates to the use of olefinically unsaturated esters with a special structure as emulsifiers in emulsion polymerization.

In a first embodiment, the present invention relates to a process for the production of polymers by emulsion polymerization of olefinically unsaturated monomers, in which olefinically unsaturated esters corresponding to formula (I):

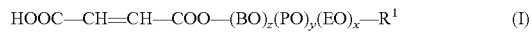

$$HOOC\text{—}CH\text{=}CH\text{—}COO\text{—}(BO)_z(PO)_y(EO)_x\text{—}R^1 \qquad (I)$$

in which $R^1$ is an alkyl group or alkenylphenol group containing 8 to 24 carbon atoms, BO is a butylene oxide unit, PO is a propylene oxide unit and EO is an ethylene oxide unit and the indices x, y and z independently of one another stand for 0 or for numbers of 1 to 50, with the proviso that at least one of the indices x, y and z is not 0, the carboxyl group of the compounds (I) being completely or partly present in neutralized form and the C=C double bond being cis- or trans-configured, are used as copolymerizable emulsifiers.

If the C=C double bond of the olefinically unsaturated esters of formula (I) is cis-configured, the esters are maleic acid esters; if it is trans-configured, they are fumaric acid esters. Maleic acid esters of formula (I) are preferred for the purposes of the invention.

As mentioned above, $R^1$ may be an alkyl group or an alkylphenol group containing 8 to 24 carbon atoms. Alkyl groups may be linear or branched, non-cyclic or cyclic. If $R^1$ contains a cyclic structural element, this structural element may also carry one or more alkyl substituents which, in turn, may be linear or branched. An alkylphenol group is understood to be a phenyl group which may be substituted by one or more alkyl groups. The group $R^1$ contains a total of 8 to 24 carbon atoms. $R^1$ is preferably an alkyl group, linear and branched alkyl groups being particularly preferred.

The compounds (I) are preferably used in partly or completely neutralized form ("salt form") in the emulsion polymerization. This form is readily accessible by completely or partly neutralizing the compounds (I) by standard methods, for example with alkali metal or alkaline earth metal hydroxides, such as sodium, potassium, calcium or magnesium hydroxide, or with amines, such as ammonia or ethanolamines. The salt form of the compounds (I) is distinguished by good solubility in water.

The process according to the invention using the compounds (I), particularly in salt form, is distinguished by the fact that polymers with particular shear and electrolyte resistance and a low coagulate content are obtained. In one embodiment of the invention, the latices obtained are additionally distinguished by particular resistance to water and stability to variations in temperatures and show no migration of the emulsifier into the film. Another advantage of the process according to the invention is that it is substantially foam-free and that the formation of volatile organic substances is reliably avoided. Since the emulsifier (I) is substantially quantitatively incorporated in the polymer, its use does not involve any biodegradability problems either. In addition, the olefinically unsaturated esters (I) show hardly any tendency towards homopolymerization. The process according to the invention is further distinguished by the fact that it leads to positive performance properties, such as for example a distinctly lower water absorption of the films produced, particularly those based on styrene/butyl acrylate or vinyl acetate/butylacrylate.

The examples mentioned illustrate the positive properties of the olefinically unsaturated esters in question. Combinations with typical non-ionic and anionic surfactants can also be used and also show a positive property profile.

DETAILED DESCRIPTION OF THE INVENTION

Olefinically Unsaturated Esters (I)

The olefinically unsaturated esters (I) to be used as emulsifiers in the process according to the invention may be obtained by relevant methods of preparative organic chemistry. One such method comprises, for example, reacting maleic acid or maleic anhydride with an end-capped polyglycol ether corresponding to formula (II):

$$HO\text{—}(BO)_z(PO)_y(EO)_xR^1 \tag{II}$$

in which $R^1$, BO, PO, EO, x, y and z are as defined for formula (I), in a molar ratio of about 1:0.9 to 1:1.1 over a period of 4 to 6 hours at temperatures of 80 to 120° C. and continuously removing the water of reaction. If desired, the partial ester (I) formed may then be completely or partly neutralized, as mentioned above.

Typical examples of emulsifiers (I) which may be used in the process according to the invention are olefinically unsaturated esters in which the substituent $R^1$ is derived from fatty alcohols, such as for example caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, myristyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol and technical mixtures thereof. Emulsifiers of formula (I) in which $R^1$ is a $C_{8-14}$ alkyl group are preferred.

One embodiment is characterized by the use of emulsifiers of formula (I), in which x and y independently of one another stand for numbers of 1 to 20 and z is the number 0. Emulsifiers of formula (I) in which x is a number of 3 to 12 and more particularly 3 to 8 and y and z are each the number 0 are preferably used. Another preferred embodiment is characterized by the use of emulsifiers of formula (I) in which $R^1$ is a $C_{8-14}$ alkyl group. A further embodiment is characterized by the use of emulsifiers of formula (I) in which $R^1$ is a nonylphenyl group.

In one embodiment, the emulsifiers (I) are used in quantities of 0.1 to 25% by weight, based on the sum of the monomers.

Monomers

The olefinically unsaturated esters of general formula (I) to be used in accordance with the invention are suitable as emulsifiers in the emulsion polymerization of almost all industrially important, substantially water-insoluble monomers, but preferably (meth)acryl, styrene and vinyl compounds. Typical examples of these monomers are aromatic vinyl compounds, for example styrene, divinyl benzene or vinyltoluene, polymerizable olefins and diolefins, such as propene, butadiene or isoprene, esters of acrylic or methacrylic acid with linear or branched $C_{1-18}$ alcohols, more particularly $C_{1-8}$ alcohols, and—in a particularly preferred embodiment—methyl esters, ethyl esters and butyl esters thereof, vinyl esters of $C_{2-12}$ acids, more particularly vinyl acetate, vinyl propionate, vinyl-2-ethyl hexanoate and vinyl laurate, vinyl alkyl ethers containing $C_{1-8}$ alkyl groups, vinyl chloride, vinylidene chloride and the like.

The above-mentioned monomers may be homopolymerized or copolymerized with other compounds from the above-mentioned list in the presence of the copolymerizable emulsifiers (I) to be used in accordance with the invention. Copolymerizations involving up to 50% by weight of other, basically, partly or completely water-soluble monomers different from the compounds (I) according to the invention, for example acrylonitrile, methacrylonitrile, semiesters of maleic or fumaric acid containing 1 to 8 carbon atoms, acrylic acid, methacrylic acid, maleic acid, fumaric acid, crotonic acid and/or itaconic acid, may also be carried out.

In a preferred embodiment of the process according to the invention, combinations of styrene/butyl acrylate, vinyl acetate/butyl acrylate or styrene/butadiene are used as monomers.

Co-emulsifiers

The olefinically unsaturated esters (I) to be used in accordance with the invention may also be used in combination with known nonionic and/or anionic co-emulsifiers. This can lead to dispersions with increased stability, for example towards shear forces, temperature influences and electrolytes. The co-emulsifiers are added in quantities of 0.5 to 5% by weight and preferably 1 to 3% by weight, based on the monomers used as a whole. The co-emulsifiers may be introduced together with the emulsifiers at the beginning of the polymerization or may be added during the polymerization. In another variant, a pre-emulsion is prepared using the co-emulsifiers on their own or together with emulsifiers and is added during the polymerization. The dispersions obtained using the acrylic acid and/or methacrylic acid esters may also be stabilized by addition of co-emulsifiers.

The olefinically unsaturated esters of formula (I) to be used in accordance with the invention may also be used together with protective colloids. Typical examples of protective colloids are completely or partly saponified homopolymers and/or copolymers of vinyl acetate, for example partly saponified polyvinyl acetate, or completely saponified copolymers of vinyl acetate and vinyl ethers. Preferred copolymers contain 1 to 4 carbon atoms in the ether part of the polyvinyl ether. Other protective colloids may be derived from polysaccharides. Thus, cellulose ethers, such as hydroxyethyl cellulose, hydroxypropyl cellulose, carboxymethyl cellulose, methyl cellulose, ethyl cellulose, or cellulose mixed ethers are particularly suitable. Polyacrylamide and copolymers thereof with acrylic acid, acrylonitrile or acrylic esters are also suitable. Condensation products of naphthalene sulfonic acid and formaldehyde or other water-soluble formaldehyde resins, more particularly urea/formaldehyde resins, may also be used. Finally, casein, gelatin, gum arabic and natural starch and substituted starch derivatives, such as hydroxyethyl starch are suitable protective colloids.

Emulsion Polymerization

In practice, the aqueous dispersions typically to be prepared using the olefinically unsaturated esters of general formula (I) in the first step of the process contain 15 to 75% by weight polymerized monomers (dry residue) in water or in a mixture of water and water-soluble organic solvents. The range from 20 to 60% by weight dry residue is preferred, although aqueous dispersions containing less than 15% by weight dry residue can be produced for special applications. Other typical polymerization auxiliaries, more particularly initiators, for example inorganic peroxide compounds, such as potassium or ammonium persulfate or hydrogen peroxide; organic peroxide compounds or organic azo compounds, providing they are suitable for emulsion polymerization, may also be used in the above-mentioned emulsion polymerization processes. The initiators are used in typical quantities, i.e. 0.05 to 2% by weight and preferably 0.1 to 0.5% by weight. Other suitable auxiliaries are buffers, for example sodium hydrogen carbonate, sodium pyrophosphate or sodium acetate, which may be used in quantities of up to 2% by weight. Accelerators, such as formaldehyde sulfoxylate, may also be used. Any of the molecular weight regulators typically used in emulsion polymerization, for example butenol or even organic thio compounds, such as mercaptoethanol, thioglycolic acid, octyl mercaptan or tert.-dodecyl mercaptan, may also be used. The polymerization processes may be carried out by any of the methods typically used in emulsion polymerization, for example initially introducing all the reactants and adding monomers or an emulsion. The temperature of the polymerization medium is generally kept at a value of 40 to 100° C. and more particularly 50 to 90° C., The pH is preferably kept at a value of 3 to 9, although emulsion polymerization at lower pH values is also possible with the compounds according to the invention. The possible variants of emulsion polymerization processes mentioned above are preferably carried out in coolable and heatable reactors equipped with stirrers and temperature sensors, for example in stirred pressure reactors. Coiled tube reactors or so-called loop reactors may also be used. On completion of polymerization, the polymer dispersion is preferably cooled and removed from the reactor through sieves. If the reaction products are to be isolated as solid products, the polymer dispersion is preferably precipitated or spray-dried. However, the dispersions obtained in the polymerization are preferably used directly as binders for paints, adhesives, paper coating compositions and other coating compositions. Other conditions for emulsion polymerization processes using the methacrylic acid esters of general formula (I) to be used in accordance with the invention may be adapted to meet particular requirements or freely selected in the usual way by the expert.

The olefinically unsaturated esters of formula (I) to be used in accordance with the invention can be polymerized easily and completely together with other, different olefinically unsaturated monomers and promote the formation of a foam-free and homogeneous emulsion. Accordingly, the present invention also relates to the use of olefinically unsaturated esters corresponding to formula (I):

$$\text{HOOC—CH}=\text{CH—COO—(BO)}_z(\text{PO})_y(\text{EO})_x R^1 \qquad (I)$$

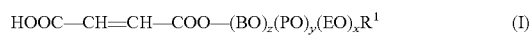

in which $R^1$ is an alkyl group or alkenylphenol group containing 8 to 24 carbon atoms, BO is a butylene oxide unit, PO is a propylene oxide unit and EO is an ethylene oxide unit and the indices x, y and z independently of one another stand for 0 or for numbers of 1 to 50, with the proviso that at least one of the indices x, y and z is not 0, the carboxyl group of the compounds (I) being completely or partly present in neutralized form and the C=C double bond being cis- or trans-configured, as copolymerizable emulsifiers in the emulsion polymerization of olefinically unsaturated monomers.

EXAMPLES

Emulsifiers Used (I)

Emulsifier 1: reaction product of an addition product of 5 mol ethylene oxide onto 1 mol of a $C_{10}$ fatty alcohol and maleic anhydride in a molar ratio of 1:1 neutralized with sodium hydroxide. Active substance content=25% by weight in water.

Emulsifier 2: reaction product of an addition product of 5 mol ethylene oxide onto 1 mol of a $C_{10}$ fatty alcohol and maleic anhydride in a molar ratio of 1:1 neutralized with ammonia. Active substance content=25% by weight in water.

Emulsifier 3: reaction product of an addition product of 3 mol ethylene oxide onto 1 mol of a $C_{12}$ fatty alcohol and maleic anhydride in a molar ratio of 1:1 neutralized with sodium hydroxide. Active substance content=25% by weight in water.

Disponil® A 3065: commercially available emulsifier based on ethoxylated fatty alcohols, active substance content ca. 65% by weight in water (Cognis Deutschland GmbH & Co. KG). Used as co-emulsifier in Examples 8 and 9.

Sulfopon® 101 spez.: commercially available emulsifier based on sodium lauryl sulfate, active substance content ca. 30% by weight in water (Cognis Deutschland GmbH & Co. KG). Used as co-emulsifier in Examples 8 and 9.

Disponil® AES 13: commercially available emulsifier based on alkyl acrylate polyether sulfate, Na salt, active substance content ca. 32% by weight in water (Cognis Deutschland GmbH & Co. KG). Used as co-emulsifier in Examples 8 and 9.

Test Methods

The emulsions produced were characterized by the following parameters:

The dry residue was determined as follows: 5 g of the emulsion were introduced into a Satorius type 709301 dry residue apparatus and dried to constant weight. The result is expressed in percent by weight dry residue. The figures in the following Tables are meant to be interpreted accordingly.

The viscosity (Brookfield) of the emulsions produced was determined at 20 r.p.m. using spindle No. 1, the emulsions being used as such. In the following Tables, viscosity is expressed in mPas.

The pH of the emulsions produced was electrochemically determined using a pH electrode to DIN 19268.

The mean particle diameter of the emulsions produced was determined using a Coulter Nano-Sizer. In the following Tables, particle diameter is expressed in nm (nanometers).

The total coagulate content of the emulsions produced was gravimetrically determined after filtration through an 80 micrometer filter (wet coagulate). The coagulate content thus determined is expressed in % coagulate, based on the solids content of the emulsion. The solids content of the emulsion is understood to be the quantity of monomers used. The coagulate content is an important quantity to the expert for evaluating the quality of an emulsion produced by emulsion polymerization.

Example 1

| Addition 1 (pre-emulsion) | |
| --- | --- |
| styrene | 235.0 g |
| butyl acrylate | 235.0 g |
| methacrylic acid | 7.5 g |
| acrylamide | 7.5 g |
| N-methylolacrylamide | 15.0 g |
| emulsifier 1*[)] | 12.5 g |
| demineralized water | 287.5 g |
| Addition 2 | |
| sodium metabisulfite | 2.5 g |
| demineralized water | 97.5 g |
| Addition 3 | |
| sodium peroxodisulfate | 2.5 g |
| demineralized water | 97.5 g |

[*)quantity, based on 100% active substance]

Procedure

The reactor was charged with addition 3 and 150 ml of addition 1.

The reactor was purged with nitrogen for 15 minutes and then heated to 63° C. The polymerization was initiated at 60° C. by introducing 5 ml of addition 2 into the reactor.

Additions 1 (rest) and 2 were continuously introduced over 2.5 hours at 63° C.

The reaction mixture was left to polymerize for 1 hour at an internal temperature of 63° C. To this end, the temperature of the heating jacket was brought to 66° C.

After cooling to 20° C., a pH of 6.8 was adjusted with ammonia.

Example 2

Exactly as Example 1 except that emulsifier 1 in addition 1 was replaced by the same quantity of emulsifier 2. A pH of 7.5 was adjusted in the final neutralization step.

Test Results for Examples 1 and 2

| | Example 1 | Example 2 |
| --- | --- | --- |
| Dry residue in % | 42.4 | 42.7 |
| Brookfield viscosity in mPas (20 r.p.m./spindle No. 1) | 80 | 80 |
| pH of the dispersion | 6.8 | 7.5 |
| Mean particle diameter in nm | 388 | 562 |
| Total coagulate in % | 0.13 | 0.20 |

By comparison with conventional emulsifiers, the coagulum content at 0.13 and 0.20% (based on the monomers used) is very good.

Example 3

As Example 1, except that only half the quantity of emulsifier 1 (i.e. 6.25 g) was used in addition 1.

Example 4

As Example 2, except that only half the quantity of emulsifier 2 (i.e. 6.25 g) was used in addition 1.

Test Results for Examples 3 and 4

| | Example 3 | Example 4 |
| --- | --- | --- |
| Dry residue in % | 50.1 | 47.4 |
| Brookfield viscosity in mPas (20 r.p.m./spindle No. 1) | 40 | 30 |
| pH of the dispersion | 7.2 | 7.3 |
| Mean particle diameter in nm | 725 | 600 |
| Total coagulate in % | 0.13 | 0.43 |

The results in regard to the coagulate are good; the mean particle diameter is larger and the viscosity lower.

Example 5

| Addition 1 | |
| --- | --- |
| potassium persulfate | 1.17 g |
| demineralized water | 150.00 g |
| Addition 2 | |
| vinyl acetate | 370.92 g |
| butyl acrylate | 157.44 g |
| acrylic acid | 5.34 g |
| emulsifier 1*[)] | 10.67 g |
| demineralized water | 304.46 g |

[*)quantity based on 100% active substance]

Procedure

The reactor was charged with addition 1 and 90 ml of addition 2.

The reactor was purged with nitrogen for 15 mins. and then heated to around 73° C. The polymerization was initiated at 70° C. by starting the continuous introduction of addition 2.

The continuous introduction of addition 2 lasted 200 minutes during which the temperature varied between 70 and 75° C.

The reaction mixture was left to polymerize for 1 hour at an internal temperature of 75° C.

After cooling to 40° C., a slightly alkaline pH was adjusted with ammonia.

Example 6

As Example 5, except that emulsifier 1 in addition 2 was replaced by the same quantity of emulsifier 2.

Example 7

As Example 5, except that emulsifier 1 in addition 2 was replaced by the same quantity of emulsifier 3.

Comparison Example 1

Comparison 1

As Example 5, except that emulsifier 1 in addition 2 was replaced by the same quantity of the commercially available emulsifier Trem® LF 40.

Test Results for Examples 5 to 7

|  | Comp. 1 | Example 5 | Example 6 | Example 7 |
|---|---|---|---|---|
| Dry residue in % | 54.7 | 52.6 | 42.4 | 51.4 |
| Brookfield viscosity in mPas (20 r.p.m./spindle No. 1) | 40 | 450 | 40 | 260 |
| pH of the dispersion | 7.4 | 7.9 | 7.4 | 7.7 |
| Mean particle diameter in nm | 182 | 320 | 360 | 312 |
| Total coagulate in % | 13.3 | 2.9 | 3.3 | 6.0 |

By comparison with the emulsion obtained using the commercially available emulsifier (Comp. 1), the emulsions obtained using the emulsifiers according to the invention (Example 5 to 7) showed distinctly smaller coagulum contents.

Example 8

As Example 5, except that, besides emulsifier 1 used in a quantity of 5.7 g, the co-emulsifier Disponil® A 3065 in a quantity of 8.7 g was also used in addition 2.

Example 9

As Example 8, except that the co-emulsifier Disponil® A 3065 was not used together with emulsifier 1 according to the invention in addition 2, but only in the after-reaction phase.

Test Results for Examples 8 and 9

|  | Example 8 | Example 9 |
|---|---|---|
| Dry residue in % | 52.7 | 52.4 |
| Brookfield viscosity in mPas (20 r.p.m./spindle No. 1) | 138 | 25 |
| pH of the dispersion | 7.2 | 7.3 |
| Mean particle diameter in nm | 337 | 386 |
| Total coagulate in % | 1.9 | 1.9 |

The addition of the co-emulsifier in Examples 8 and 9 produces a reduction in the coagulate content by comparison with Example 5.

Example 10

| Addition 1 | |
|---|---|
| 2-ethylhexyl acrylate | 225.40 g |
| methyl methacrylate | 254.80 g |
| methacrylic acid | 9.80 g |
| emulsifier 1*⁾ | 2.94 g |
| potassium persulfate | 1.92 g |
| demineralized water | 252.50 g |
| Addition 2 | |
| emulsifier 1*⁾ | 6.90 g |
| sodium hydrogen carbonate | 0.50 g |
| potassium persulfate | 0.24 g |
| demineralized water | 190.00 g |
| Neutralization | |
| sodium hydrogen carbonate | 5.5 g |
| demineralized water | 49.50 g |

[*⁾quantity based on 100% active substance]

Procedure

The reactor was charged with addition 2.

The reactor was purged with nitrogen for 15 mins. and then heated to around 88° C. The polymerization was initiated at 85° C. by starting the continuous introduction of addition 1 (pre-emulsion).

The continuous introduction of addition of 1 lasted 80 minutes during which the temperature varied between 87 and 91° C.

The reaction mixture was left to polymerize for 1 hour at an internal temperature of 88° C.

After cooling to 40° C., the pH was adjusted with an aqueous solution of sodium hydrogen carbonate (neutralization).

Example 11

As Example 10, except that emulsifier 1 in addition 2 was replaced by the same quantity of emulsifier 3.

Test Results for Examples 10 and 11

|  | Example 10 | Example 11 |
|---|---|---|
| Dry residue in % | 48.1 | 49.2 |
| Brookfield viscosity in mPas (20 r.p.m./spindle No. 1) | 240 | 50 |
| pH of the dispersion | 6.4 | 6.2 |
| Mean particle diameter in nm | 160 | 125 |
| Total coagulate in % | 0.64 | 2.1 |

Comparison Example 2

Comparison 2

As Example 1, except that emulsifier 1 in addition 2 was replaced by the same quantity of the commercially available emulsifier Sulfopon® 101 spez.

Comparison Example 3

Comparison 3

As Example 1, except that emulsifier 1 in addition 2 was replaced by the same quantity of the commercially available emulsifier Disponil® AES 13.

Example 12

Application Example

To determine the water absorption of polymer films to DIN EN 1024, three films of the polymer dispersions prepared as described above were tested. Each of the films measured 75×35×0.5 mm. The films were produced in PTFE molds and dried for 48 hours at 50° C., as known to the expert. The dried films were removed from the mold and weighed (to an accuracy of ±0.1 milligram). The films were then placed in deionized water for 48 hours at 20° C. The weight of the wet films was determined. The wet films were first carefully blotted with tissue paper to remove water droplets from the surface of the film. The quantity of water absorbed, which is the difference in weight between the wet film and the dry film, was calculated in relation to the weight of the dry film in % by weight. The results of the various tests are set out in the following Table:

| Polymer system | According to | Water absorption |
|---|---|---|
| Styrene/acrylate | Example 1 | 11.4% |
| Vinyl acetate/butyl acrylate | Example 8 | 7.2% |
| Vinyl acetate/butyl acrylate | Example 9 | 10.8% |
| Vinyl acetate/butyl acrylate | Example 7 | 20.5% |
| Styrene/acrylates | Example 2 | 18.4% |
| Styrene/acrylates | Comparison 2 | 13.9% |
| Vinyl acetate/butyl acrylate | Comparison 3 | 40% |

Example 13

Application Example

To determine the electrolyte resistance of the polymer dispersions prepared as described above, quantities of 10 ml of the polymer dispersion were mixed with quantities of 10 ml of the following salt solutions:

10% NaCl solution 10% CaCl$_2$ solution 10% Al$_2$(SO$_4$)$_3$ solution

The dispersions were then visually evaluated. The results are set out in the following Table. It is pointed out in this regard that the salts of 1-, 2- and 3-valent metals were tested by visually evaluating the coagulation behavior after addition of the metal salt solutions to the polymer dispersion. In the absence of coagulation, the system counted as "stable". The term "stable" in the following Table is meant to be interpreted in this sense.

| Polymer system | According to | Stable to NaCl | Stable to CaCl$_2$ | Stable to Al$_2$(SO$_4$)$_3$ |
|---|---|---|---|---|
| Styrene/acrylate | Example 1 | Yes | Yes | Yes |
| Vinyl acetate/butyl acrylate | Example 8 | Yes | Yes | |
| Vinyl acetate/butyl acrylate | Example 9 | Yes | Yes | |
| Vinyl acetate/butyl acrylate | Example 7 | Yes | | |
| Styrene/acrylate | Example 2 | Yes | Yes | Yes |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process for preparing a polymer emulsion by emulsion polymerization, comprising:
   (a) providing an aqueous emulsion, the emulsion comprising:
      (i) a major amount, based on the polymerizable components of the emulsion, of at least one substantially water-insoluble olefinically unsaturated monomer;
      (ii) from about 1% to about 6% by weight of a water-soluble monomer, based on the combined weight of the monomers (i) and (ii), selected from the group consisting of acrylonitrile, methacrylonitrile, C1-C8 semiesters of maleic acid, C1-C8 semiesters of fumaric acid, acrylic acid, methacrylic acid, maleic acid, fumaric acid, crotonic acid, itaconic acid, acrylamide, N-methylolacrylamide and combinations thereof;
      (iii) at least one copolymerizable emulsifier; and
      (iv) water,
   wherein the copolymerizable emulsifier comprises at least one olefinically unsaturated ester of formula (I):

$$HOOC-CH=CH-COO-(BO)_z(PO)_y(EO)_x-R^1 \qquad (I)$$

wherein $R^1$ represents an alkyl group or alkenylphenol group having from 8 to 24 carbon atoms, BO represents a butylene oxide unit, PO represents a propylene oxide unit and EO represents an ethylene oxide unit and each of x, y and z independently represents a number of from 0 to 50, with the proviso that at least one of x, y and z is not 0, and wherein the carboxylic acid group is completely or partly neutralized; and
   (b) emulsion polymerizing at least a portion of said aqueous emulsion (a) to form a polymer emulsion.

2. The process according to claim 1, wherein x and y each independently represent a number of from 1 to 20 and z represents zero.

3. The process according to claim 1, wherein x represents a number of from 3 to 5 and y and z represent zero.

4. The process according to claim 1, wherein $R^1$ represents an alkyl group having from 8 to 14 carbon atoms.

5. The process according to claim 2, wherein $R^1$ represents an alkyl group having from 8 to 14 carbon atoms.

6. The process according to claim 3, wherein $R^1$ represents an alkyl group having from 8 to 14 carbon atoms.

7. The process according to claim 1, wherein the copolymerizable emulsifier is present in an amount of from 0.1 to 25% by weight based on the combined weight of monomers (i) and (ii).

8. The process according to claim 2, wherein the copolymerizable emulsifier is present in an amount of from 0.1 to 25% by weight based on the combined weight of monomers (i) and (ii).

9. The process according to claim 4, wherein the copolymerizable emulsifier is present in an amount of from 0.1 to 25% by weight based on the combined weight of monomers (i) and (ii).

10. The process according to claim 5, wherein the copolymerizable emulsifier is present in an amount of from 0.1 to 25% by weight based on the combined weight of monomers (i) and (ii).

11. The process according to claim 1, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

12. The process according to claim 2, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

13. The process according to claim 4, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

14. The process according to claim 5, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

15. The process according to claim 7, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

16. The process according to claim 9, wherein the at least one substantially water-insoluble olefinically unsaturated monomer comprises a compound selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof.

17. A process for preparing a polymer emulsion by emulsion polymerization, comprising:
(a) providing an aqueous emulsion, the emulsion comprising:
(i) a major amount, based on the polymerizable components of the emulsion, of at least one substantially water-insoluble olefinically unsaturated monomer selected from the group consisting of aromatic vinyl compounds, olefins, diolefins, esters of acrylic or methacrylic acid with linear or branched $C_{1-18}$ alcohols, vinyl esters of $C_{2-12}$ acids, vinyl alkyl ethers containing $C_{1-8}$ alkyl groups, and mixtures thereof;
(ii) from about 1% to about 6% by weight of a water-soluble monomer, based on the combined weight of the monomers (i) and (ii), selected from the group consisting of acrylonitrile, methacrylonitrile, C1-C8 semiesters of maleic acid, C1-C8 semiesters of fumaric acid, acrylic acid, methacrylic acid, maleic acid, fumaric acid, crotonic acid, itaconic acid, acrylamide, N-methylolacrylamide and combinations thereof;
(iii) at least one copolymerizable emulsifier; and
(iv) water,
wherein the copolymerizable emulsifier is present in an amount of from 0.1 to 25% by weight based on the combined monomers (i) and (ii), and wherein the copolymerizable emulsifier comprises at least one olefinically unsaturated ester of formula (Ia):

$$\text{HOOC—CH=CH—COO-(EO)}_x\text{—R}^1 \qquad \text{(Ia)}$$

wherein $R^1$ represents an alkyl group having from 8 to 14 carbon atoms, EO represents an ethylene oxide unit and x represents a number of from 3 to 5, and wherein the carboxylic acid group is completely or partly neutralized; and
(b) emulsion polymerizing at least a portion of said aqueous emulsion (a) to form a polymer emulsion.

18. The process of claim 1, wherein said water-soluble monomers are selected from the group consisting of acrylic acid, methacrylic acid, acrylamide, N-methylolacrylamide, and combinations thereof.

19. The process of claim 17, wherein said water-soluble monomers are selected from the group consisting of acrylic acid, methacrylic acid, acrylamide, N-methylolacrylamide, and combinations thereof.

* * * * *